United States Patent
Kurita

(10) Patent No.: US 8,681,115 B2
(45) Date of Patent: Mar. 25, 2014

(54) INFORMATION PROCESSING APPARATUS AND INPUT CONTROL METHOD

(75) Inventor: Yukihiro Kurita, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/605,742

(22) Filed: Sep. 6, 2012

(65) Prior Publication Data

US 2012/0327008 A1 Dec. 27, 2012

Related U.S. Application Data

(63) Continuation of application No. 13/040,114, filed on Mar. 3, 2011.

(30) Foreign Application Priority Data

Mar. 3, 2010 (JP) .................................. 2010-046985

(51) Int. Cl.
*G06F 3/041* (2006.01)

(52) U.S. Cl.
USPC ............................ 345/173; 715/701; 715/702

(58) Field of Classification Search
USPC .................... 345/173–178; 178/18.01–18.09; 715/701, 702
See application file for complete search history.

(56) References Cited

U.S. PATENT DOCUMENTS

| 7,312,791 | B2 | 12/2007 | Hoshino et al. | |
|---|---|---|---|---|
| 7,339,581 | B2 | 3/2008 | Katayose | |
| 7,952,566 | B2 | 5/2011 | Poupyrev et al. | |
| 2004/0021681 | A1* | 2/2004 | Liao | 345/702 |
| 2004/0108995 | A1 | 6/2004 | Hoshino et al. | |
| 2004/0204141 | A1* | 10/2004 | Nakayama | 455/566 |
| 2005/0156904 | A1* | 7/2005 | Katayose | 345/173 |
| 2006/0197753 | A1 | 9/2006 | Hotelling | |
| 2007/0268270 | A1 | 11/2007 | Onodera et al. | |
| 2008/0024459 | A1 | 1/2008 | Poupyrev et al. | |
| 2008/0062145 | A1 | 3/2008 | Shahoian et al. | |
| 2009/0051667 | A1 | 2/2009 | Park et al. | |
| 2010/0144395 | A1* | 6/2010 | Komiya | 455/566 |
| 2010/0169773 | A1* | 7/2010 | Yoo et al. | 715/702 |
| 2010/0238129 | A1 | 9/2010 | Nakanishi et al. | |
| 2011/0185319 | A1* | 7/2011 | Carapelli | 715/863 |

FOREIGN PATENT DOCUMENTS

| JP | 2004-086733 | 3/2004 |
|---|---|---|
| JP | 2005-190290 | 7/2005 |
| JP | 2008-033739 | 2/2008 |
| JP | 2010-224658 | 10/2010 |

OTHER PUBLICATIONS

U.S. Appl. No. 13/040,114, filed Mar. 3, 2011, Yukihiro Kurita.
Notice of Reasons for Rejection mailed by the Japan Patent Office on May 10, 2011 in Japanese patent app. No. 2010-046985 in 4 pages.
Notice of Reasons for Rejection mailed by the Japan Patent Office on Jul. 19, 2011 in Japanese patent app. No. 2010-046985 in 6 pages.

* cited by examiner

*Primary Examiner* — Koosha Sharifi-Tafreshi
(74) *Attorney, Agent, or Firm* — Knobbe, Martens, Olson & Bear LLP

(57) ABSTRACT

According to one embodiment, an information processing apparatus includes a touch screen display, a vibrator, an area display module, a touch position detector, and a vibration controller. The vibrator is configured to vibrate the touch screen display. The area display module is configured to display a first area on the touch screen display. The touch position detector is configured to detect a touch position on the touch screen display. The vibration controller is configured to control the vibrator in order to vibrate with a first pattern, if the touch position moves from an inside of the first area to an outside of the first area.

9 Claims, 7 Drawing Sheets

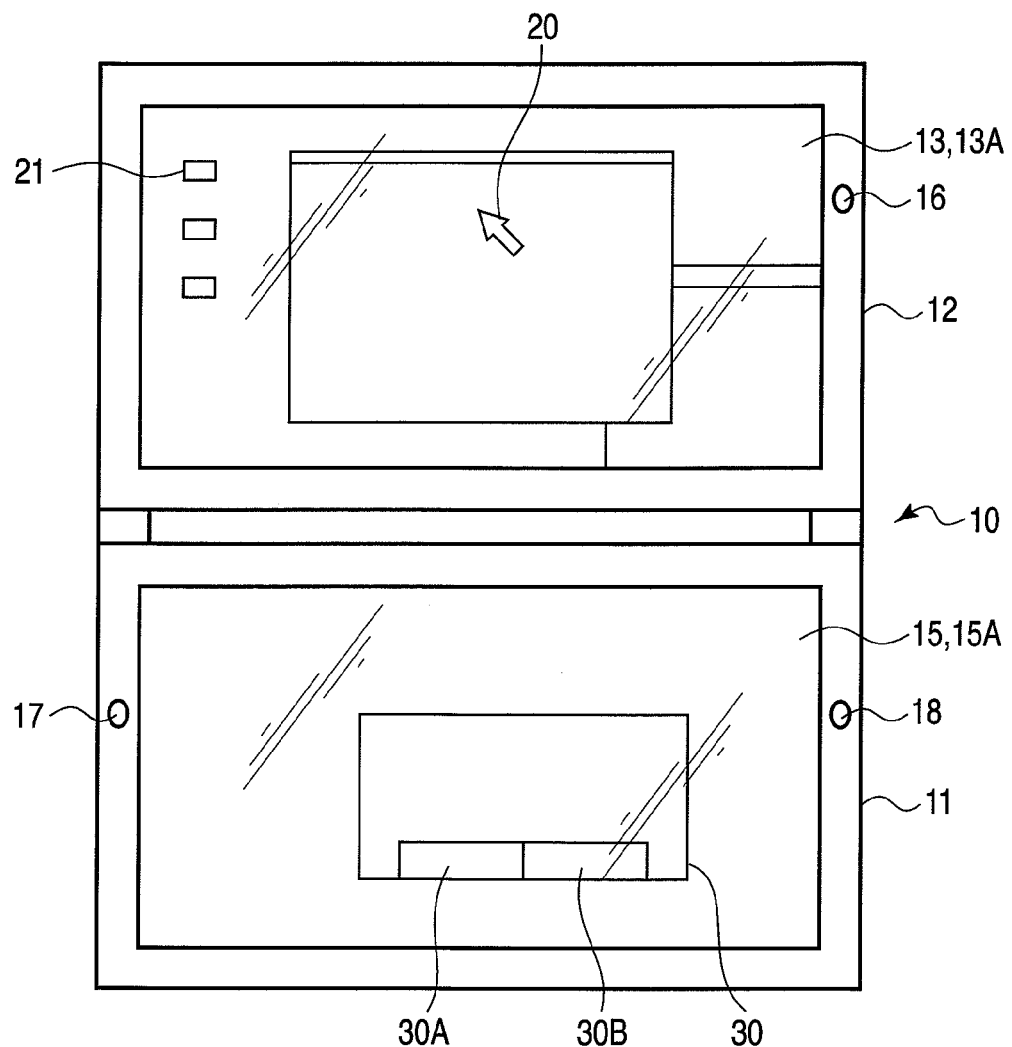
F I G. 2

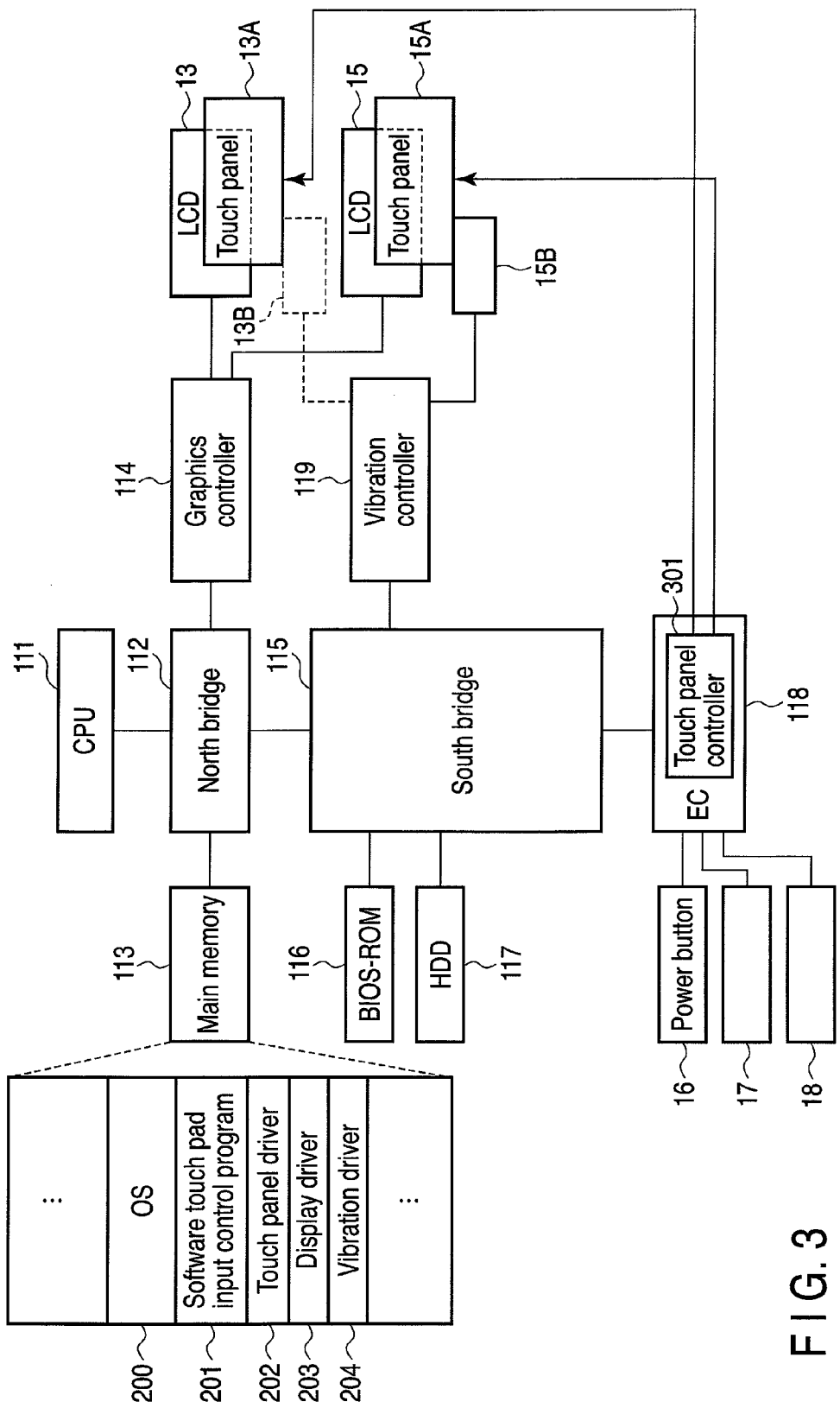
F I G. 3

INFORMATION PROCESSING APPARATUS AND INPUT CONTROL METHOD

CROSS-REFERENCE TO RELATED APPLICATIONS

This application is a continuation of U.S. patent application Ser. No. 13/040,114, filed on Mar. 3, 2011, which is based upon and claims the benefit of priority from Japanese Patent Application No. 2010-046985, filed Mar. 3, 2010, the entire contents of each of which are incorporated herein by reference.

FIELD

Embodiments described herein relate generally to an information processing apparatus including a touch screen display, and an input control method.

BACKGROUND

In recent years, various types of personal computers, such as notebook-type personal computers, have been developed. In most of notebook-type personal computers, a touch pad is provided as an input device, in addition to the keyboard. In addition, recently, there has been developed a personal computer which is provided with a touch screen display for an easier input operation by a user, and which enables input by a touch operation on the touch screen display with use of a fingertip or a pen.

Aside from the personal computers, there are various kinds of apparatuses having touch panels. For example, Jpn. Pat. Appln. KOKAI Publication No. 2005-190290 discloses an input control device wherein if a user touches an area on a menu window, where a button of a touch panel is not displayed, the touch panel is vibrated with a vibration pattern VP1. If the user moves, while keeping the touch on the touch panel, the touch position on the touch panel into the coordinate range of the button, the input control device generates once again the vibration pattern VP1, which indicates the acceptance of a button select operation, at a time point when the touch position has entered the coordinate range of the button. Thereafter, if the user performs a de-touch operation or presses the button for a long time, a button decision operation is accepted.

In the prior art, in order to make surer the button operation, the touch panel is vibrated when the touch position has been moved into the range of the button, thereby making it possible to confirm that the button is touched. However, even if the touch panel is vibrated, unless the touch operation is performed while the touch screen is being viewed, it is difficult to perform the touch operation itself on a specific area of, e.g. the button, which is set on the touch screen. For example, in the case where an operation has to be performed on the specific area of the touch screen while a display, which is provided in addition to the touch screen, is being confirmed, the operation becomes very difficult.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 2 is an exemplary view showing an example of a software touch pad which is displayed on a touch screen display of the information processing apparatus in the embodiment;

FIG. 3 is an exemplary block diagram showing an example of the system configuration of the information processing apparatus in the embodiment;

DETAILED DESCRIPTION

Various embodiments will be described hereinafter with reference to the accompanying drawings.

In general, according to one embodiment, an information processing apparatus comprises a touch screen display, a vibrator, an area display module, a touch position detector, and a vibration controller. The vibrator is configured to vibrate the touch screen display. The area display module is configured to display a first area on the touch screen display. The touch position detector is configured to detect a touch position on the touch screen display. The vibration controller is configured to control the vibrator in order to vibrate with a first pattern, if the touch position moves from an inside of the first area to an outside of the first area.

An embodiment will now be described with reference to the accompanying drawings.

Figure 1:
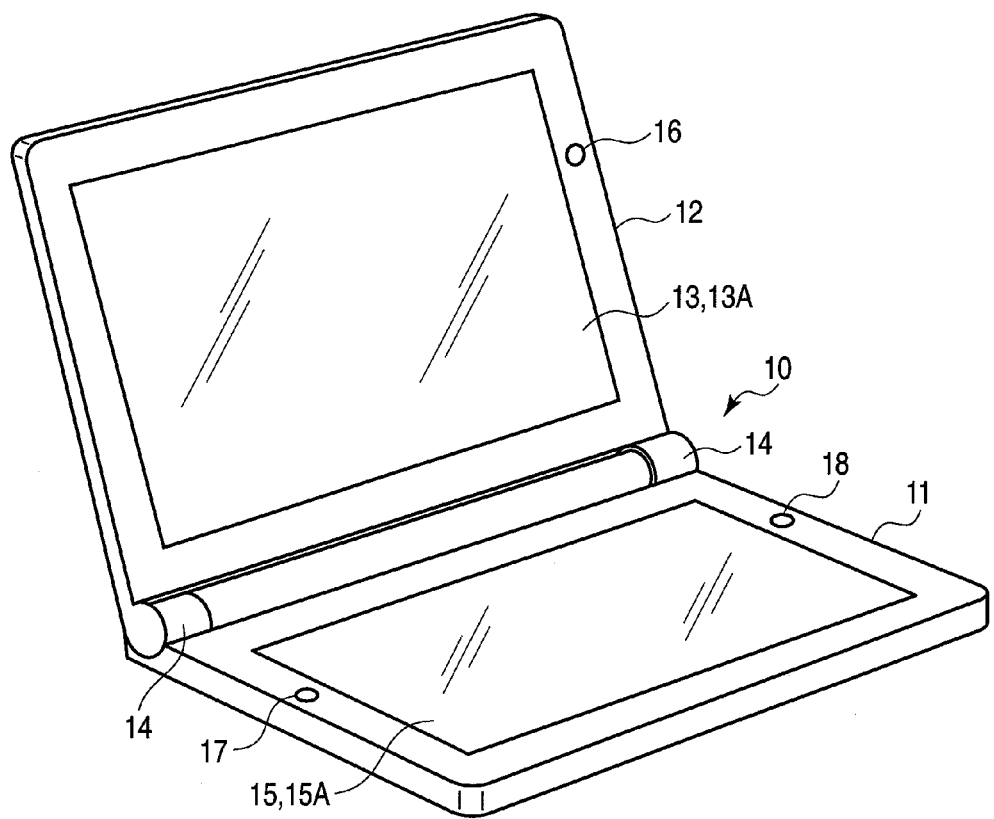
FIG. 1 is an exemplary external appearance view showing an information processing apparatus according to an embodiment.

FIG. 1 is an external appearance view showing an information processing apparatus according to the embodiment. This information processing apparatus is realized, for example, as a battery-powerable portable personal computer 10.

FIG. 1 is a perspective view showing the personal computer 10 in a state in which a display unit 12 of the personal computer 10 is opened. The personal computer 10 comprises a computer main body 11 and the display unit 12. A touch screen display, which is composed of a liquid crystal display (LCD) 13 and a touch panel 13A, is built in an upper surface of the display unit 12. A display screen of this touch screen display is disposed at a substantially central part of the display unit 12.

The touch screen display is configured, for example, such that the touch panel 13A is attached to the surface of the LCD 13, and the touch screen display can realize display by the LCD 13 and the detection of a touch position which is touched by a pen or a finger. The user can select various objects (e.g. icons representing folders and files, menus and buttons), which are displayed on the LCD 13, by using a fingertip or a pen. The coordinate data corresponding to the touch position on the display screen is input from the touch panel 13A to the CPU in the computer 10. The display unit 12 may be configured such that only the LCD 13 is built in.

The display unit 12 has a thin box-shaped housing. The display unit 12 is rotatably attached to the computer main body 11 via a hinge module 14. The hinge module 14 is a coupling module for coupling the display unit 12 to the computer main body 11. Specifically, a lower end portion of the display unit 12 is supported on a rear end portion of the computer main body 11 by the hinge module 18. The display unit 12 is attached to the computer main body 11 such that the display unit 12 is rotatable, relative to the computer main body 11, between an open position where the top surface of the computer main body 11 is exposed and a closed position where the top surface of the computer main body 11 is covered by the display unit 12. A power button 16 for powering on or off the personal computer 10 is provided at a predetermined position of the display unit 12, for example, on the right side of the touch screen display (LCD 13).

The computer main body 11 is a base unit having a thin box-shaped housing. A touch screen display, which is composed of a liquid crystal display (LCD) 15 and a touch panel 15A, is built in an upper surface of the computer main body 11. A display screen of this touch screen display is disposed at a substantially central part of the computer main body 11.

The touch screen display is configured, for example, such that the touch panel 15A is attached to the surface of the LCD 15, and the touch screen display can realize display by the LCD 15 and the detection of a touch position which is touched by a pen or a finger. Like the touch screen display provided on the display unit 12, the user can select various objects (e.g. icons representing folders and files, menus and buttons), which are displayed on the LCD 15, by using a fingertip or a pen. The coordinate data corresponding to the touch position on the display screen is input from the touch panel 15A to the CPU in the computer 10. The LCD 15 on the computer main body 11 is a display which is independent from the LCD 13 of the display unit 12. The LCDs 13 and 15 can be used as a multi-display system for realizing a virtual screen environment. In this case, the virtual screen, which is managed by the operating system of the computer 10, includes a first screen region, which is displayed on the LCD 13, and a second screen region, which is displayed on the LCD 15. The first screen region and the second screen region can display arbitrary application windows, arbitrary objects, etc., respectively.

In the embodiment, as shown in FIG. 2, by executing a software touch pad input control program, an area (first area) indicative of a virtual touch pad, which provides the same function as a touch pad used as a general pointing device, can be set on the LCD 15 (touch screen display) provided on the computer main body 11. Hereinafter, the area indicative of the virtual touch pad is referred to as a software touch pad (SW touch pad) 30. The SW touch pad 30 has, for example, a rectangular shape, and includes an area (second area) corresponding to left and right buttons of a general touch pad. Hereinafter, an area corresponding to the left button is referred to as a software left button 30A, and an area corresponding to the right button is referred to as a software right button 30B. Position data indicative of a touch position is input by a touch operation on the SW touch pad 30. The SW touch pad 30 can perform a tap operation, which is an instantaneous touch operation, and a drag operation which is an operation of moving a touch position while keeping touching.

On the other hand, as shown in FIG. 2, the LCD 13 of the display unit 12 can be used as a main display for displaying various application windows. The user can instruct movement of a cursor 20 displayed on the LCD 13, by a drag operation on the SW touch pad 30 that is displayed on the touch screen display (LCD 15), or can instruct selection of an icon 21 or menu display by a touch operation on the software left button 30A or software right button 30B.

Two button switches 17 and 18 are provided at predetermined positions on the upper surface of the computer main body 11, for example, on both sides of the LCD 15. Arbitrary functions can be assigned to the button switches 17 and 18. For example, the button switch 17 can be used as a button switch for starting the software touch pad input control program that is an application program for controlling an input operation using the SW touch pad 30. When the button switch 17 is pressed by the user, the software touch pad input control program is started. The software touch pad input control program displays the SW touch pad 30 on the LCD 15 (touch screen display), and executes a process corresponding to a touch operation on the SW touch pad 30.

In addition, the software touch pad input control program in the embodiment controls a vibration generation function which makes it possible to confirm that a touch operation is correctly performed on the SW touch pad 30, based on the presence/absence of vibration, without viewing the SW touch pad 30. The details of the vibration generation function will be described later.

Next, the system configuration of the personal computer 10 is described. FIG. 3 is a block diagram showing the system configuration of the personal computer 10. In the embodiment, the case is described by way of example, in which touch screen displays are mounted on both the computer main body 11 and the display unit 12.

The personal computer 10 includes a CPU 111, a north bridge 112, a main memory 113, a graphics controller 114, a south bridge 115, a BIOS-ROM 116, a hard disk drive (HDD) 117, an embedded controller 118, and a vibration controller 119.

The CPU 111 is a processor which is provided in order to control the operation of the computer 10. The CPU 111 executes an operating system (OS) 200 and various application programs, which are loaded from the HDD 117 into the main memory 113. The application programs include a software touch pad input control program (SWTP input control program) 201. The SWTP input control program 201 displays the SW touch pad 30 on the touch screen display, and generates data corresponding to a touch operation on the SW touch pad 30 by the user. The generated data (e.g. position data indicative of a touch position on the SW touch pad 30, or code data corresponding to the button 30A, 30B) is delivered to, for example, the operating system (OS) 200, or an active application via the OS 200. Further, the CPU 111 also executes a system BIOS (Basic Input/Output System) which is stored in the BIOS-ROM 116. The system BIOS is a program for hardware control.

Besides, under the control of the OS 200, the CPU 111 executes a touch panel driver 202 which controls the driving of the touch panels 13A and 15A, a display driver 203 which controls the display on the LCDs 13 and 15, and a vibration driver 204 which controls the vibration of motors 13B and 15B functioning as vibration generation modules which are attached to the touch panels 13A and 15A.

The north bridge 112 is a bridge device which connects a local bus of the CPU 111 and the south bridge 115. The north bridge 112 includes a memory controller which access-controls the main memory 113. The graphics controller 114 is a display controller which controls the two LCDs 13 and 15 which are used as a display monitor of the computer 10.

The graphics controller 114 executes a display process (graphics arithmetic process) for drawing display data on a video memory (VRAM), based on a drawing request which is received from CPU 111 via the north bridge 112. A recording area for storing display data corresponding to a screen image which is displayed on the LCD 13 and a recording area for storing display data corresponding to a screen image which is displayed on the LCD 15 are allocated to the video memory. The transparent touch panel 13A is disposed on the display surface of the LCD 13. Similarly, the transparent touch panel 15A is disposed on the display surface of the LCD 15.

Each of the touch panels 13A and 15A is configured to detect a touch position on a touch detection surface by using, for example, a resistive method or a capacitive method. As the touch panel 13A, 15A, use may be made of a multi-touch panel which can detect a plurality of touch positions at the same time.

The motor 15B for generating vibration is attached to the touch panel 15A. The motor 15B is fixed to, for example, a frame which holds the touch panel 15A. The motor 15B is rotated and driven, thereby transmitting vibration to the entirety of the touch panel 15A. The user can feel vibration by touching the touch panel 15A when the motor 15B is being rotated and driven.

In the case of enabling the use of the vibration generation function also in the touch screen display provided on the display unit 12, the motor 13B may be provided on the touch panel 13A and vibration may similarly be generated.

The motor 13B, 15B, which is attached to the touch panel 13A, 15A, may not be a single one, and a plurality motors (vibration generation modules) may be provided for the motor 13B, 15B.

The vibration controller 119 is configured to drive the motor 13B, 15B that are attached to the touch panel 13A, 15A. Under the control of the CPU 111 (SWTP input control program 201), the vibration controller 119 can switch a plurality of vibration patterns (VP1, VP2) for driving the motor 13B, 15B.

In the information processing apparatus in the embodiment, the motor 13B, 15B is mounted as the vibration generation module for generating vibration in the touch panel 13A, 15A. Alternatively, a module for generating mechanical, electrical or electromagnetic vibration may be mounted.

The south bridge 115 incorporates an IDE (Integrated Drive Electronics) controller and a Serial ATA controller for controlling the HDD 121. The embedded controller (EC) 118 has a function of powering on/off the computer 10 in accordance with the operation of the power button switch 16 by the user. In addition, the embedded controller (EC) 118 includes a touch panel controller 301 for controlling each of the touch panels 13A and 15A.

Figure 4:
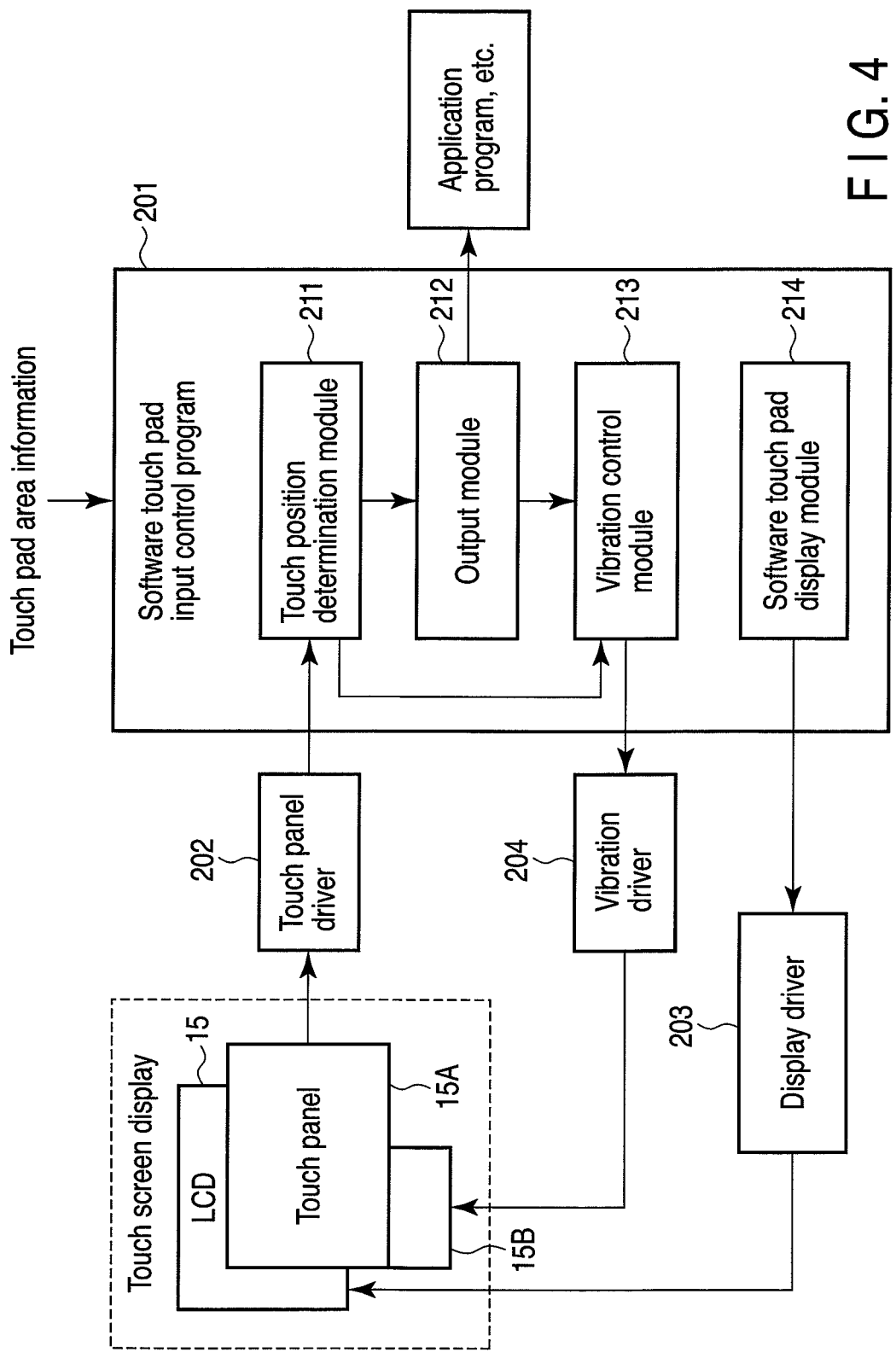
FIG. 4 is an exemplary view showing a structure example of a software touch pad input control program in the embodiment.

Next, referring to FIG. 4, the structure of the SWTP input control program 201 is described. In this example, only the touch screen display (LCD 15, touch panel 15A, motor 15B), which is provided on the computer main body 11, is shown as the object of control of the SWTP input control program 201. In the case where the touch screen display is also provided on the display unit 12, the same control is executed, and so a description of this case is omitted here.

The SWTP input control program 201 includes, as function executing modules, a touch position determination module 211, an output module 212, a vibration control module 213 and a software touch pad display module 214.

The touch position determination module 211 determines a touch position on the touch panel 15A, based on data which is received via the touch panel driver 202.

Based on the touch position determined by the touch position determination module 211, the output module 212 generates position data indicative of the touch position on the SW touch pad 30 and code data corresponding to the button 30A, 30B, and outputs the generated data to the OS 200 or other application programs.

The vibration control module 213 controls the rotational drive (generation of vibration) of the motor 15B via the vibration driver 204, in accordance with the touch position determined by the touch position determination module 211. When the touch position determined by the touch position determination module 211 has moved from the inside of the SW touch pad 30 to the outside of the SW touch pad 30 (i.e. when a drag operation has been performed), the vibration control module 213 executes control to vibrate the motor 15*b* with a first pattern while the touch position is on the outside of the SW touch pad 30. Thereby, it can be confirmed by the vibration of the first vibration pattern that the position of the touch operation on the SW touch pad 30 has moved to the outside of the area of the SW touch pad 30. In addition, when the touch position determined by the touch position determination module 211 is on the software left button 30A or software right button 30B (second area), the vibration control module 213 executes control to vibrate the motor 15B with a second pattern which is different from the first pattern. Thereby, the touch operation on the software left button 30A or software right button 30B can be confirmed by the vibration of the second pattern. In the meantime, the vibration control module 213 does not vibrate the motor 15B when the touch position determined by the touch position determination module 211 has moved from that area of the SW touch pad 30, which excludes the software left button 30A or software right button 30B, to the inside of the software left button 30A or software right button 30B, that is, when the touch position has been moved by the drag operation from the inside of the SW touch pad 30 to the inside of the button.

The software touch pad display module 214 causes, via the display driver 203, the LCD 15 to display the SW touch pad 30 (including the software left button 30A and software right button 30B). In accordance with an instruction from the user, the software touch pad display module 214 can vary at least one of the display position and the display size of the SW touch pad 30. It is assumed that the display position and the display size of the SW touch pad 30 are recorded as touch pad area information.

The display position of the SW touch pad 30 is varied in the following manner. For example, when the SW touch pad 30 is being displayed, a predetermined position on the SW touch pad 30 (e.g. a handle mark or a handle area which is added to the SW touch pad 30) is touched, and thereby a transition occurs to a move mode. If the touch position is moved (dragged) while the touching is being kept, the display position of the SW touch pad 30 is varied in accordance with the touch position.

The size of the SW touch pad 30 is varied in the following manner. For example, when the SW touch pad 30 is being displayed, a predetermined position on the SW touch pad 30 (e.g. a corner portion or a side portion) is touched, and thereby a transition occurs to a size change mode. If the touch position is moved (dragged) while the touching is being kept, the position of the sides of the SW touch pad 30 is varied in accordance with the touch position. Alternatively, the size of the SW touch pad 30 may be varied by accepting a setup operation from the user by additionally using a SW touch pad utility program. For example, a touch pad setup screen is displayed, and the user is prompted to select one of "large", "middle" and "small" on this setup screen as the size of the SW touch pad 30. In accordance with the selection, the data indicative of the size of the SW touch pad 30 is recorded as touch pad area information.

Figure 5:
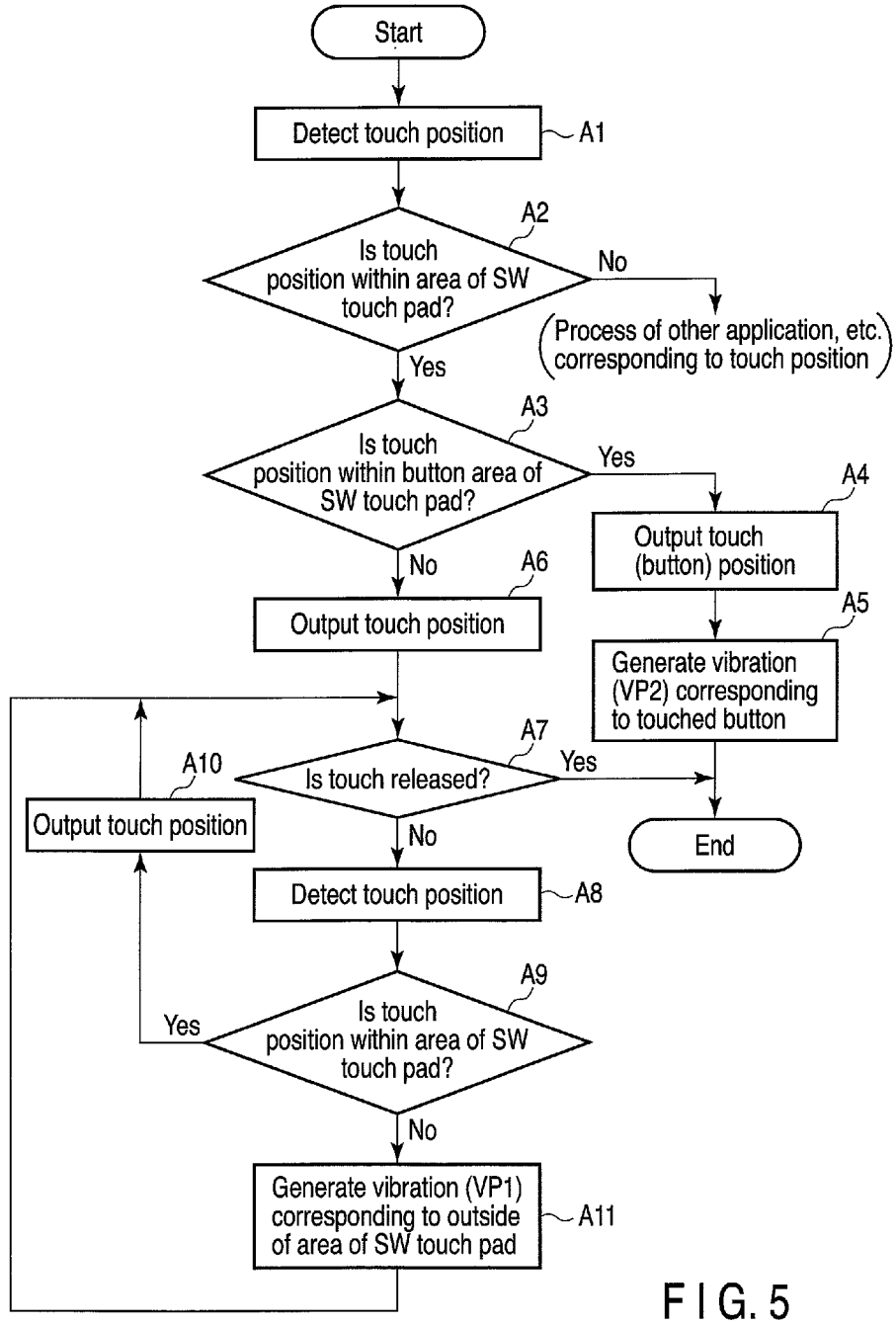
FIG. 5 is an exemplary flow chart illustrating the operation of the software touch pad input control program in the embodiment.

Next, referring to a flow chart of FIG. 5, a description is given of the operation of the software touch pad input control in the embodiment.

The personal computer 10 starts the SWTP input control program 201 when a specific application using the SW touch pad 30 is to be executed or when the user has designated the SW touch pad 30 by the button 17. If the SWTP input control program 201 is started, the software touch pad display module 214 refers to pre-recorded touch pad area information, and displays on the LCD 15 the SW touch pad 30 at the display position with the display size, which are indicated by the touch pad area information.

When an application in which the SW touch pad 30 is used is executed, the display by the application is effected, for example, on the LCD 13. Thus, viewing the display on the LCD 13 of the display unit 12, the user operates the SW touch pad 30 displayed on the LCD 15. Specifically, the user cannot perform a touch operation on the SW touch pad 30 while viewing the SW touch pad 30 at all times. In the present embodiment, vibration is generated if a touch position has moved to the outside of the area of the SW touch pad 30 while the user is performing a drag operation on the SW touch pad 30. Thus, even if the user does not view the SW touch pad 30, the user can recognize that the touch position is not correct.

To start with, if a touch operation is performed on the touch panel 15A by the user, the touch position determination module 211 receives via the touch panel driver 202 the coordinate data which is detected by the touch panel 15A. Thereby, the touch position determination module 211 detects that the touch operation has been performed and determines the touch position by the user on the touch screen display (block A1). In addition, the touch position determination module 211 refers to the touch pad area information (the display position and display size of the SW touch pad 30) and determines whether the touch position is in the area of the SW touch pad 30 (block A2).

If the touch position is not in the area of the SW touch pad 30 (No in block A2), the SWTP input control program 201 does not execute a process corresponding to the data indicative of the touch position which has been input. For example, even when the SW touch pad 30 is displayed, if a window or an object (icon) is displayed on the LCD 15 by the OS 200 or some other application, a touch operation can be performed on the window or object. In this case, the process is executed by not the application using the SW touch pad 30, but the OS 200 or other application.

On the other hand, if the touch position is in the area of the SW touch pad 30 (Yes in block A2), the touch position determination module 211 determines whether the touch position is on the button area of the software left button 30A or the software right button 30B. If it is determined that the touch position is in the button area (Yes in block A3), the output module 212 generates a code of the button corresponding to the touch position, and outputs the generated code to an application program, etc.

Figure 6:
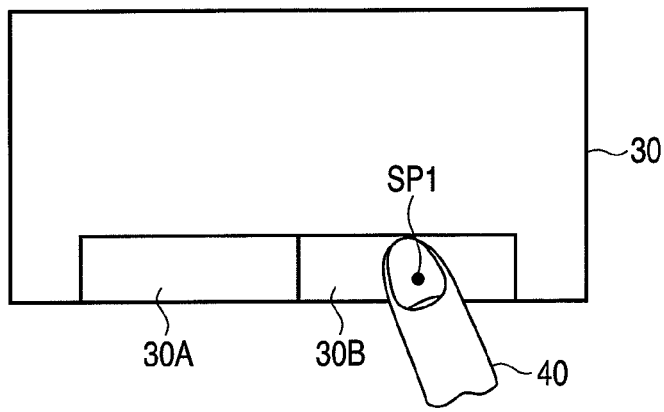
FIG. 6 is an exemplary view showing an example of an operation on the software touch pad in the embodiment.

For example, as shown in FIG. 6, if the user touches a position SP1 included in the area of the software right button 30B by the finger 40, the output module 212 informs the application program, etc., that the software right button 30B has been selected by the user.

In addition, the vibration control module 213 vibrates, via the vibration driver 204, the motor 15B with a vibration pattern (VP2) corresponding to the touched button.

In this manner, when the touch operation is performed on the software left button 30A and software right button 30B, the vibration pattern corresponding to the button is generated.

Thus, the user feels the vibration, for example, by the fingertip, and can exactly recognize that the operation of selecting the button has been performed.

The vibration pattern of the motor 15B may be made different between the case in which the software left button 30A is touched and the case in which the software right button 30B is touched.

When it is determined that the touch position is not in the button area (No in block A3), the output module 212 generates position data corresponding to the touch position on the SW touch pad 30, and outputs the generated position data to the application program, etc. (block A6). Specifically, if the outside of the button area on the SW touch pad 30 is touched, it is determined that position designation by a pointing device has been executed.

If a drag operation of moving the touch position while keeping the touching is performed, the touch position determined module 211 detects the touch position in accordance with the movement of the touch position (block A8).

If the drag operation is performed within the area of the SW touch pad 30 (Yes in block A9), the output module 212 successively outputs the position data corresponding to the touch position to the application program, etc. (block A10).

Figure 7:
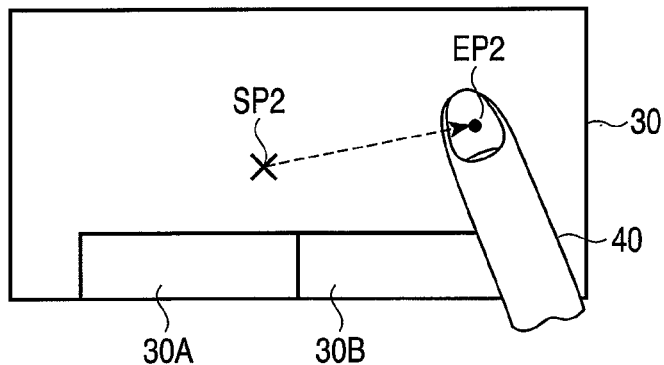
FIG. 7 is an exemplary view showing an example of the operation on the software touch pad in the embodiment.

For example, as shown in FIG. 7, if the touch position has been moved from an initial touch position SP2 to a present touch position EP2 by a drag operation, the position data between the initial touch position SP2 and the present touch position EP2 is output (block A7 to block A10). As a result, for example, the cursor 20 displayed on the LCD 13 is moved in accordance with the drag operation. In FIG. 7, the path of movement of the touch position is indicated by a broken line.

If the touch position by the drag operation has been moved from the inside of the SW touch pad 30 to the outside of the SW touch pad 30 (No in block A9), the vibration control module 213 vibrates, via the vibration driver 204, the motor 15B with a vibration pattern (VP1) corresponding to "out-of-area", while the touch position is on the outside of the area of the SW touch pad 30, thereby indicating that the touch position is on the outside of the area (block A11).

Figure 8:
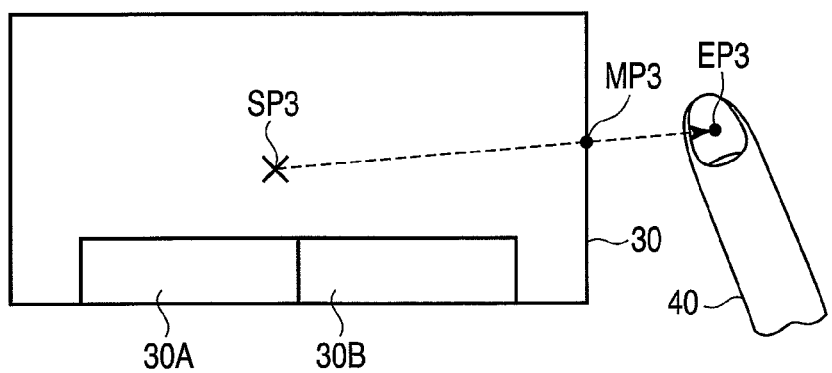
FIG. 8 is an exemplary view showing an example of the operation on the software touch pad in the embodiment.

For example, as shown in FIG. 8, in the case where the touch position has been moved from an initial touch position SP3 to a present touch position EP3, which is on the outside of the SW touch pad 30, by a drag operation, no vibration is generated while the touch position moves from the touch position SP3 to a touch position MP3 on the boundary of the SW touch pad 30, and position data during this time is output (blocks A7 to A10). Vibration is generated while the touch position moves from the touch position MP3 to the touch position EP3, and position data during this time is not output (blocks A7 to A9, block A11).

Thereby, without viewing the SW touch pad 30, the user can recognize, by the vibration, that the touch position has moved to the outside of the SW touch pad 30, while performing the drag operation on the SW touch pad 30.

In the case where the touch position has been moved by a drag operation from the inside of the SW touch pad 30, which excludes the button area, to the button area of the software left button 30A or software right button 30B, the output module 212 does not output code data, etc. corresponding to the button 30A, 30B, even if the touch position is in the area of the software left button 30A or software right button 30B. If the touch position has been moved by the drag operation to the outside of the SW touch pad 30 through the button area, the vibration control module 213 generates vibration in the same manner as described above.

Figure 9:
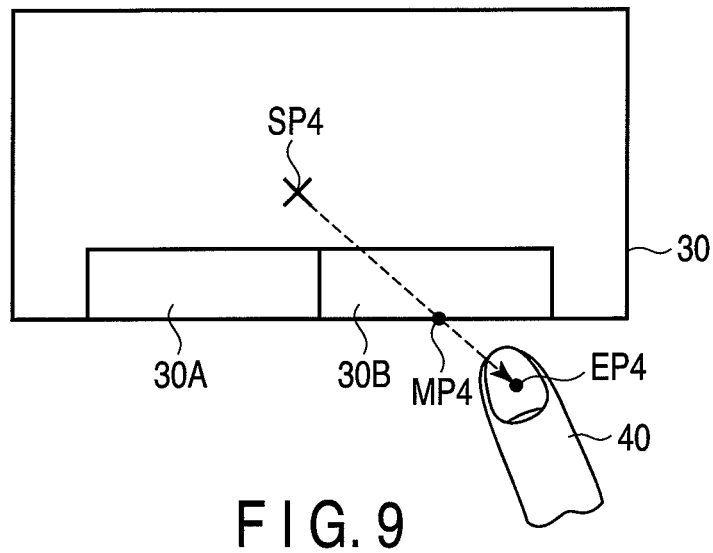
FIG. 9 is an exemplary view showing an example of the operation on the software touch pad in the embodiment.

For example, as shown in FIG. 9, when the touch position has been moved by a drag operation from a first touch position SP4 through the area of the software right button 30B to a present touch position EP4 on the outside of the SW touch pad 30, no vibration is generated until the touch position moves from the touch position SP4 to a touch position MP4 on the boundary of the SW touch pad 30, and position data including data on the button area is output during this time (blocks A7 to A10). Then, vibration is generated while the touch position moves from the touch position MP4 to the touch position EP4, and no position data is output during this time (blocks A7 to A9, block A11). In the drag operation within the SW touch pad 30, the position data including data on the button area is output, and thereby the entire area of the SW touch pad 30 can effectively be used.

Figure 10:
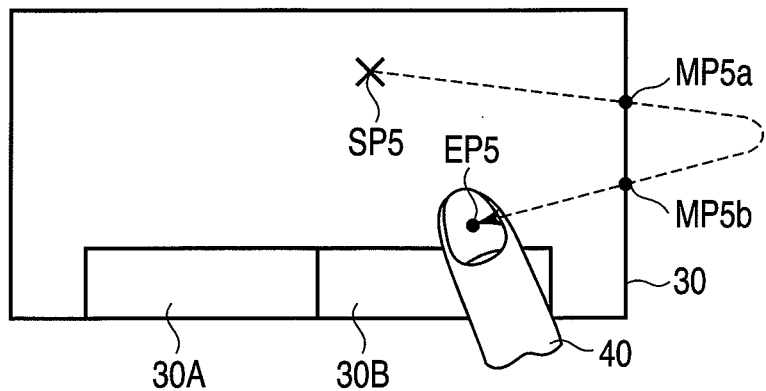
FIG. 10 is an exemplary view showing an example of the operation on the software touch pad in the embodiment.

As shown in FIG. 10, in the case where the touch position has been moved by a drag operation from an initial touch position SP5 to the outside of the SW touch pad 30 and then moved to a touch position EP5 within the SW touch pad 30, no vibration is generated until the touch position moves from the touch position SP5 to a touch position MP5a on the boundary of the SW touch pad 30, and position data including data on the button area is output during this time (blocks A7 to A10). Then, vibration is continuously generated while the touch position moves from the touch position MP5a to a touch position MP5b between which the drag operation is being performed on the area outside the SW touch pad 30, and no position data is output during this time (blocks A7 to A9, block A11). Then, the vibration is stopped while the touch position is moved from the touch position MP5b to the touch position EP5 within the area of the SW touch pad 30, and position data is output while the position data moves from the touch position MP5b to the touch position EP5.

Specifically, if the user has moved the touch position to the outside of the SW touch pad 30 by the drag operation, the user can move the touch position back to the SW touch pad 30 after recognizing by the vibration that the touch operation is performed on the outside of the SW touch pad 30. Thereby, the user can continue the drag operation.

As has been described above, with the use of the SW touch pad 30 in the embodiment, when the touch position by the drag operation has moved from the inside of the SW touch pad 30 to the outside of the SW touch pad 30, vibration is generated to make the user recognize this movement of the touch position. Thereby, the user can easily perform the operation without viewing the SW touch pad 30.

In particular, even when the size or position of the SW touch pad 30 is varied, the user can confirm by vibration that the drag operation is being performed on the outside of the SW touch pad 30. Thus, the user can easily understand the varied size or position of the SW touch pad 30.

In the above description, when the touch position by the drag operation has moved from the inside of the SW touch pad 30 to the outside of the SW touch pad 30, the vibration is generated by the motor 15B. However, the vibration may be generated under other conditions.

For example, when the drag operation is being performed within the SW touch pad 30, fine vibration is generated so as to indicate that the touch position is within the SW touch pad 30. Then, when the touch position has been moved to the outside of the SW touch pad 30 by the drag operation, the vibration is stopped or the vibration is increased, thus making the user recognize this movement of the touch position.

In the above description, the vibration pattern (VP2), which is generated when the software left button 30A or software right button 30B is touched, is different from the vibration pattern (VP1) which is generated when the touch position by the drag operation is moved to the outside of the area of the SW touch pad 30. Alternatively, the intensity of the vibration, instead of the vibration pattern, may be made different.

The process that has been described in connection with the present embodiment may be stored as a computer-executable program (SWTP input control program 201) in a recording medium such as a magnetic disk (e.g. a flexible disk, a hard disk), an optical disk (e.g. a CD-ROM, a DVD) or a semiconductor memory, and may be provided to various apparatuses. The program may be transmitted via communication media and provided to various apparatuses. The computer reads the program that is stored in the recording medium or receives the program via the communication media. The operation of the apparatus is controlled by the program, thereby executing the above-described process.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a touch screen display;
a vibrator configured to vibrate the touch screen display;
an area display module configured to display an area used as a pointing device on the touch screen display;
a touch position detector configured to detect a touch on the touch screen display and determine a touch position;
a vibration controller configured to control the vibrator to effect continuous vibration of the touch screen display, after the touch position moves from inside of the area to outside of the area while the touch position detector is detecting the touch on the touch screen, while the touch position is still located at the outside of the area; and also to control the vibrator to stop the vibration of the touch screen display, when the touch position moves from the outside of the area to the inside of the area while the touch position detector is detecting the touch on the touch screen; and
an output module configured to output position data corresponding to the touch position as an operation of the pointing device while vibration of the vibrator is stopped by the vibration controller and the touch position is located within the area, and to stop outputting of the position data corresponding to the touch position as an operation of the pointing device while vibration of the vibrator is effected by the vibration controller and the touch position, while the touch is detected, is moved from the area to outside thereof.

2. The apparatus of claim 1, further comprising a storing module configured to store area information which is indicative of at least one of a display position and a display size of the area, wherein the touch position detector is configured to detect, based on the area information, whether the touch position is within the area.

3. An information processing apparatus comprising:
a touch screen display;
a vibrator configured to vibrate the touch screen display;
an area display module configured to display a first area on the touch screen display;
a touch position detector configured to detect a touch on the touch screen display and determine a touch position;
a vibration controller configured to cause the vibrator to vibrate the touch screen display with a first pattern after the touch position determined by the touch position detector moves from inside of the first area to outside of the first area, to cause the vibrator to vibrate the touch screen display with a second pattern while the touch position is within a second area continuous with the first area, and to control the vibrator in order not to vibrate the touch screen display, when the touch position moves from the first area to the second area while the touch position detector is detecting the touch on the touch screen display; and
an output module configured to output position data corresponding to the touch position as an operation of the pointing device while vibration of the vibrator is stopped by the vibration controller and the touch position is located within the first area, and to stop outputting of the position data corresponding to the touch position as an operation of the pointing device while vibration of the vibrator is effected by the vibration controller and the touch position, while the touch is detected, is moved from the first area to outside thereof.

4. An information processing apparatus comprising:
a touch screen display;
a first housing comprising the touch screen display;
a second housing comprising a display rotatably attached to the first housing;
a vibrator configured to vibrate the touch screen display;
an area display module configured to display an area used as a pointing device on the touch screen display;
a touch position detector configured to detect a touch on the touch screen display and determine a touch position;
a vibration controller configured to cause the vibrator to vibrate the touch screen display after the touch position determined by the touch position detector moves from inside of the area to outside of the area; and
an output module configured to output position data corresponding to the touch position as an operation of the pointing device while vibration of the vibrator is stopped by the vibration controller and the touch position is located within the area, and to stop outputting of the position data corresponding to the touch position as an operation of the pointing device while vibration of the vibrator is effected by the vibration controller and the touch position, while the touch is detected, is moved from the area to outside thereof.

5. The apparatus of claim 4, wherein the touch screen display and the display comprise a multi-display system for realizing a virtual screen environment.

6. An input control method of an information processing apparatus which is provided with a touch screen display and a vibrator configured to vibrate the touch screen display, the method comprising:
displaying an area used as a pointing device on the touch screen;
detecting a touch on the touch screen display;
determining a touch position corresponding to the touch;
causing the vibrator to vibrate the touch screen display after the touch position moves from inside of the area to outside of the area while the touch on the touch screen display is being detected, and to cause the vibrator not to vibrate the touch screen display while the touch position is within the area; and
an output module configured to output position data corresponding to the touch position as an operation of the pointing device while vibration of the vibrator is stopped by the vibration controller and the touch position is located within the area, and to stop outputting of the position data corresponding to the touch position as an operation of the pointing device while vibration of the vibrator is effected by the vibration controller and the touch position, while the touch is detected, is moved from the area to outside thereof.

7. The method of claim 6, further comprising:
storing area information which is indicative of at least one of a display position and a display size of the area,
detecting, based on the area information, whether the touch position is within the area.

8. The method of claim 6, further comprising:
modifying the output of a second display based on the touch position, wherein the touch screen display and the second display comprise a multi-display system for realizing a virtual screen environment.

9. The information processing apparatus of claim 1, wherein the vibration controller configured to control the vibrator to vibrate in a first vibration pattern while the touch position is located in the outside of the area, and to vibrate in a second vibration pattern when a state of the touch position detector shifts from a state in which the touch position detector does not detect the touch on the touch screen display to a state in which the touch position detector detects a touch within the area.

* * * * *